(12) United States Patent
Iacovangelo et al.

(10) Patent No.: US 7,632,604 B2
(45) Date of Patent: Dec. 15, 2009

(54) ENERGY STORAGE DEVICE AND METHOD

(75) Inventors: Charles Dominic Iacovangelo, Clifton Park, NY (US); David Charles Bogdan, Jr., Scotia, NY (US); Steven Alfred Tysoe, Ballston Spa, NY (US); Michael Alan Vallance, Albany, NY (US); Guillermo Daniel Zappi, Niskayuna, NY (US); Karthick Vilapakkam Gourishankar, Karnataka (IN); Hari Nadathur Seshadri, Karnataka (IN); Guruprasad Sundararajan, Karnataka (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/769,752

(22) Filed: Jun. 28, 2007

(65) Prior Publication Data

US 2008/0145755 A1    Jun. 19, 2008

Related U.S. Application Data

(60) Provisional application No. 60/870,843, filed on Dec. 19, 2006.

(51) Int. Cl.
*H01M 4/58*  (2006.01)
*H01M 4/00*  (2006.01)

(52) U.S. Cl. .............. 429/218.1; 429/220; 429/221; 429/223; 429/229; 429/231.5; 429/231.9; 204/243.1

(58) Field of Classification Search .......... 429/9, 429/218.1; 204/243.1
See application file for complete search history.

(56) References Cited

U.S. PATENT DOCUMENTS 3,488,221 A * 1/1970 Hiroshi et al. .............. 429/103

(Continued)

FOREIGN PATENT DOCUMENTS

EP    1126536    *   8/2001

(Continued)

OTHER PUBLICATIONS

Nave Carl R., "Standard Electrode Potentials", Feb. 23, 2002, http://hyperphysics.phy-astr.gsu.edu/hbase/chemical/electrode.html (Internet archive, wayback machine).*

(Continued)

*Primary Examiner*—Dah-Wei D Yuan
*Assistant Examiner*—Kwang Han
(74) *Attorney, Agent, or Firm*—Richard A. DeCristofaro (57) ABSTRACT

An article of electrochemical energy conversion is provided that includes a separator. The separator has a first surface that defines at least a portion of a first chamber, and a second surface that defines a second chamber, and the first chamber is in ionic communication with the second chamber through the separator. The energy storage device further includes a plurality of cathodic materials. The plurality includes at least a first cathodic material and a second cathodic material. Both of the cathodic materials are in electrical communication with the separator and both are capable of forming a metal halide. A proviso is that if either of the first cathodic material or the second cathodic material is a transition metal, then the other cathodic material is not iron, arsenic, or tin.

34 Claims, 5 Drawing Sheets

U.S. PATENT DOCUMENTS

| | | | |
|---|---|---|---|
| 3,773,558 A | | 11/1973 | Charbonnier et al. |
| 3,887,396 A | * | 6/1975 | Walsh et al. ................ 429/128 |
| 3,891,457 A | * | 6/1975 | Auborn ...................... 429/104 |
| 4,136,233 A | * | 1/1979 | Eisenberg ................... 429/112 |
| 4,358,516 A | | 11/1982 | Lange |
| 4,381,968 A | * | 5/1983 | Singh ......................... 216/101 |
| 4,894,298 A | | 1/1990 | Vukson et al. |
| 4,894,299 A | | 1/1990 | Morse |
| 4,895,776 A | | 1/1990 | Virkar et al. |
| 4,910,105 A | | 3/1990 | Tilley et al. |
| 4,913,754 A | | 4/1990 | Duncan et al. |
| 4,945,012 A | | 7/1990 | Bugga et al. |
| 5,194,343 A | | 3/1993 | Bloom et al. |
| 5,332,597 A | * | 7/1994 | Carolan et al. .............. 427/243 |
| 5,342,709 A | * | 8/1994 | Yahnke et al. .............. 429/162 |
| 5,476,733 A | | 12/1995 | Coetzer et al. |
| 5,532,078 A | * | 7/1996 | Redey et al. ................ 429/104 |
| 5,554,457 A | | 9/1996 | Bugga et al. |
| 5,763,117 A | | 6/1998 | Wright et al. |
| 5,919,587 A | * | 7/1999 | Mukherjee et al. .......... 429/213 |
| 6,007,943 A | | 12/1999 | Coetzer |
| 6,117,807 A | | 9/2000 | Virkar et al. |
| 6,632,763 B2 | | 10/2003 | Virkar et al. |
| 2002/0172871 A1 | | 11/2002 | Schucker |
| 2004/0240156 A1 | * | 12/2004 | Norton et al. ............... 361/512 |
| 2005/0008932 A1 | * | 1/2005 | Plotkin ....................... 429/118 |

FOREIGN PATENT DOCUMENTS

| | | |
|---|---|---|
| GB | 2164789 A | 3/1986 |
| JP | 56096464 | 8/1981 |

OTHER PUBLICATIONS

Online translation of JP 2005-005116, Aoki et al., Jan. 6, 2005.*

Parthasarthy et al., "High Temperature Sodium—Zinc Chloride Batteries With Sodium Beta—Alumina Solid Electrolyte", 1 page, Retrieved from the Internet:< URL: http://ecsmeet3.peerx-press.org/ms_files/ecsmeet3/2006/11/27/00000574/00/574_0_art_0_j9ezIk.pdf>.

Tao, "V.9 A High Temperature (400 to 650° C.) Secondary Storage Battery Based on Liquid Sodium and Potassium Anodes", V. Advanced Research, Office of Fossil Energy Fuel Cell Program, pp. 1-4, FY 2006 Annual Report.

PCT International Search Report dated Aug. 11, 2008.

* cited by examiner

ENERGY STORAGE DEVICE AND METHOD

CROSS REFERENCE TO RELATED APPLICATIONS

This application claims the priority and benefit of U.S. Provisional Application No. 60/870,843, entitled "ENERGY STORAGE DEVICE AND METHOD" filed on Dec. 19, 2006, which is incorporated herein by reference.

BACKGROUND

1. Technical Field

The invention includes embodiments that relate to a molten salt electrochemical cell. The invention includes embodiments that relate to a method of using an electrochemical cell. The invention includes embodiments that relate to an energy storage device and an energy management device that includes the energy storage device.

2. Discussion of Related Art

Development work has been undertaken on rechargeable batteries using sodium for the negative electrodes. Sodium has a reduction potential of 2.71 volts, relatively low weight, is relatively non-toxic, is relatively abundant, available, and low in cost. The sodium has been used in liquid form, and the melting point of sodium is 98 degrees Celsius. It should be noted that the thermal cycling, pressure differential, and vibration in the cell during use may, in some circumstances, damage a beta alumina separator electrode (BASE). Accordingly, a thicker wall may lend more strength and durability to the BASE, but may have associated performance degradation due to the increased resistance caused by the thicker wall.

It may be desirable to have a molten salt electrochemical cell that has different chemistry than those electrochemical cells that are currently available. It may be desirable to have an energy storage device that differs from those methods that are currently available. It may be desirable to have an energy storage device that differs from those devices that are currently available.

BRIEF DESCRIPTION

In accordance with an embodiment of the invention, an energy storage device is provided. The energy storage device includes a separator having a first surface that defines at least a portion of a first chamber, and a second surface that defines a second chamber, and the first chamber is in ionic communication with the second chamber through the separator. The energy storage device further includes a plurality of cathodic materials. The plurality includes at least a first cathodic material and a second cathodic material. Both of the cathodic materials are in electronic communication with the separator and both are capable of forming a metal halide. A proviso that if either of the first cathodic material or the second cathodic material are a transition metal, then the other cathodic material is not iron, arsenic, or tin.

A system including the energy storage device is provided. And, a method is provided.

DETAILED DESCRIPTION

The invention includes embodiments that relate to a molten salt electrochemical cell. The invention includes embodiments that relate to a method of using an electrochemical cell. The invention includes embodiments that relate to an energy storage device and an energy management device that includes the energy storage device.

As used herein, cathodic material is the material that supplies electrons during charge and is present as part of the redox reaction as more than about 5 percent by weight of the participating electrochemical reactants on its side of the reaction. Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

In accordance with an embodiment of the invention, an energy storage device is provided. The energy storage device comprises a cathodic material in electrical communication with a separator. The cathodic material includes copper. The separator has a first surface that defines at least a portion of a first chamber, and a second surface that defines a second chamber. The first chamber is in ionic communication with the second chamber through the separator. The separator has at least one of the following attributes: the separator is a composite of alumina and a rare earth oxide, or the separator is a composite of alumina and a transition metal oxide, or the separator comprises a plurality of grains, and the grains define grain boundaries that define interstitial spaces, and the interstitial spaces defined by the grain boundaries are free of sodium aluminate prior to an initial electrical charging of the energy storage device or are free of the cathodic material after the initial electrical charging of the energy storage device, or the separator comprises a continuous phase of an alkali-metal-ion conductor and a continuous phase of a ceramic oxygen-ion conductor.

In accordance with another embodiment of the invention, an energy storage device contains a plurality of cathodic material. Selection of cathodic materials and the potential at which they are chemically active, the ratio of cathodic materials to each other, the placement of the cathodic materials relative to each other in the energy storage device, and the method of operating the energy storage device may allow for, among other functions, a state of charge (SOC) indication of the energy storage device. Other functions may include peak pulse charging, peak pulse discharging, overcharge protection, over-discharge protection, increased power, and/or increased energy density.

For state of charge indication, a first cathodic material may be majority active metal, and a second cathodic material may be paired with the first cathodic material. The second cathodic material may have a charge/discharge voltage that is different and is distinct from that of the active metal of the first cathodic material. In alternative embodiments, the second cathodic material can differ from the first cathodic material by having a lower activation voltage, or a higher activation voltage, or in some circumstances both a higher and a lower activation voltage. For example, with a copper-based first cathodic material and chlorine as a halogen, a zinc-based second cathodic material may be used. Copper is active at 2.6 volts and Zn is active at 2.2 volts. In this case, Zn may function as an end of discharge indicator, so that in the event that all CuCl was reduced to copper, the operating cathode voltage (OCV) would drop from 2.6 volts to 2.2 volts as the second cathodic material becomes available for reaction.

In some embodiments, there is a proviso that if either of the first cathodic material or the second cathodic material is nickel, then the other cathodic material is not iron, arsenic, or tin; and that if either of the first cathodic material or the second cathodic material is copper, then the other cathodic material is not arsenic or tin.

The amount of the second cathodic material may be relatively small compared to the first cathodic material amount for state of charge indication. The ratio of first to second cathodic material may be less than about 100:1. In one embodiment, the ratio may be in a range of from about 100:1 to about 75:1, from about 75:1 to about 50:1, from about 50:1 to about 25:1, from about 25:1 to about 15:1, from about 15:1 to about 5:1, or from about 5:1 to more than about 1:1.

A combination of first and second cathodic materials may increase the energy density of the energy storage device, and may provide over-discharge protection relative to a single cathodic material system. For the over-discharge protection, the second cathodic material may be selected to have an activation voltage that is lower than the first cathodic material, but higher than the activation voltage of a supporting electrolyte (such as aluminum trichloride). Thus, for example, rather than a situation in which all the Cu in a copper only system is used, so that the $AlCl_3$ electrolyte plates out as aluminum on continued operation or under too-low voltage, the Zn in a Cu/Zn system would react before the aluminum trichloride.

In one embodiment, the first cathodic material would be zinc and the second cathodic material would be copper. In this case, Cu would be the SOC indicator that would indicate when all of the Zn had been oxidized to $ZnCl_2$ at which point the operating cathode voltage would rise from 2.24 volts to 2.6 volts when the first Cu began to oxidize to CuCl. Further, the copper may provide overcharge protection. That is, the copper would be oxidized rather than the supporting electrolyte (e.g., $AlCl_3$) to $Cl_2$.

In one embodiment, the two or more cathodic materials are mixed together. In another embodiment, the first cathodic material is overcoated onto the second cathodic material. Thus, the second cathodic material would not be physically exposed, or electrochemically available, until the first cathodic material was removed or electrochemically converted. This coating technique may find applicability where active metals that dissolve in a cathodic melt (e.g., Zn and Cu) may be the first cathodic material, and where metals that do not dissolve in the cathodic melt (e.g., Ni) could be the second cathodic material.

Pulse charge and pulse discharge features may behave in an analogous fashion to each other. For pulse charge/discharge the second cathodic material may be added to provide, relative to the first cathodic material, a quicker or more reactive uptake and output of electrical energy. And, the amount of the second cathodic material may be tailored to an end-use specific requirement—as the type, placement, and amount of the second cathodic material may be based on the expected pulse amount. For example in a plug-in hybrid vehicle (PHEV) there may be a demand for 11 kilowatt-hours (kWh) of energy at a low rate of discharge (e.g., 10 kW per hour), but for a burst of 3 to 10 seconds there may be a demand for 40 kW to 50 kW. In the dual cathodic material system, the second cathodic material may be charged or discharged at a higher current than the first cathodic material. The voltage can be selected at which the material is active, and can be selected relative to the breakdown voltage of the electrolyte.

For example, with reference to the Cu/Zn example above, for a constant resistance in the cathode of 0.005 ohms and a cut off voltage of 3.4 volts before the electrolyte breakdown, the copper could operate at 3.4 volts and 160 amps at 544 Watts (3.4−2.6/0.005) and the zinc could operate at 3.4 volts and 240 amps at 816 Watts (3.4−2.2/0.005) to give a relatively higher pulse charging capability than copper alone. The zinc could also provide pulse discharge capability by controlling the normal discharge potential of the Cu cathode. With the same cell resistance the copper could discharge above 2.2 volts and 80 amps at 176 Watts (2.6−2.2/0.005). In a comparative example of a conventional electrochemical cell, this discharge scheme would completely discharge the cell (43 Ah) in ~32 minutes—described as a 2C rate.

In one embodiment, for pulse discharge at higher current the cell voltage could be lowered to 1.8 volts so that the first and second cathodic materials could discharge simultaneously, rather than sequentially. This function may be desirable in cells where electrical resistance increases with the state of charge as the reaction front of cathodic material moves deeper into the cathode and away from the separator. Relative to a standard cell the resistance that would increase from 0.005 ohms to 0.025 ohms, in this embodiment as the state of charge increases, the power from the first cathodic material (e.g., copper from above) diminishes from 176 Watts to about 57.6 Watts. It is possible to maintain the cell voltage above 2.2 volts so that the second cathodic material (e.g., zinc from above) located near the separator would still be available at the lower resistance of 0.005 volts—allowing a pulse discharge at 144 Watts.

Isolating the first cathodic material from the second cathodic material, rather than selecting by voltage, may be a suitable method of using an embodiment according to the invention. For example, in an elongate tube having a top end and a bottom end, the first cathodic material may be placed at the top end, while the second cathodic material may be placed at the bottom end. A plate to prevent mixing of the cathodic materials during use may separate the first cathodic material from the second cathodic material. Two current collectors, one in each active cathodic material, could electrically control which cathodic material was being charged and discharge.

Alternately, the cathodic material may be graded radially. The radial gradient may be formed by disposing the first cathodic in a layer near the separator surface, and the second cathodic material in the center of the cathode chamber nearer the axis. The concentration of the first cathodic material relative to the second cathodic material differs relative to the distance from the separator surface, or from the axis moving radially in the opposite direction. In one embodiment, the first cathodic material is a metal with a relatively higher activation voltage, such as zinc; and, the second cathodic material is a metal with a relatively lower activation voltage, such as nickel. This arrangement of concentration gradient may enable a maximum power pulse any time during the cycle because at least some of the second cathodic material is available for use at any state of charge.

Another feature of the dual cathodes may include an alloying potential. The alloy oxidation products may be relatively more conductive, more soluble, and have better kinetics than either of the cathodic materials alone. For example, in Ni—Zn or Cu—Zn the alloying of the two metal during the reduction of the chlorides back to metal may form an alloy whose charge properties could be relatively enhanced.

Non-limiting examples of contemplated cathodic material pairing may include:

Ni with Cu:
Cu/CuCl would provide SOC indicator
Cu/CuCl and CuCl/CuCl$_2$ would provide overcharge protection
CuCl/CuCl$_2$ would provide pulse charge
Ni with Zn, Sn:
Zn, Sn would provide SOC indicator near end of discharge
Zn, Sn would provide over-discharge protection
Zn, Sn would provide pulse discharge (if normal discharge kept above 2.2 V)
Zn, Sn would provide pulse charge
Zn could be added as metal, ZnCl$_2$ dissolved in the melt, ZnS
Sn could be added as metal or as a salt
Ni with W, Mo:
W, Mo would provide SOC indicator
Cu with W, Mo:
W, Mo would provide SOC indicator
Cu with Zn, Sn:
Zn, Sn would act the same as in Ni case above
Zn with Cu, Ni, Sn:

Ni and Cu would provide SOC indicator, and overcharge protection, and pulse discharge Unless indicated otherwise, the cathodic material may be disposed within the second chamber. With regard to the separator of the energy storage device, the second chamber can be disposed within the first chamber, and can be elongate to define an axis. Thus, the first chamber can be coaxially disposed about the axis. With further reference to the separator, it can have a cross-sectional profile normal to the axis that is a circle, a triangle, a square, a cross, or a star. Alternatively, the separator can be about planar. A planar configuration (or with a slight dome) may be useful in a prismatic or button-type battery configuration, where the separator is domed or dimpled. Similarly, the separator can be flat or undulate. The material of the separator is discussed further below.

The housing can be sized and shaped to have a cross-sectional profile that is square, polygonal, or circular; and can have a length to width ratio that is in a range of from greater than about 1:10. In one embodiment, the length to width ratio is in a range of from about 1:10 to about 1:5, from about 1:5 to about 1:1, from about 1:1 to about 5:1, from about 5:1 to about 10:1, from about 10:1 to about 15:1. The housing can be formed from a material that is a metal, ceramic, or a composite; the metal can be selected from nickel or steel, the ceramic can be a metal oxide.

Optionally, one or more shim structures can be disposed at opposing ends of the separator. The shim structures may support the separator within the volume of the housing. The shim structures can protect the separator from vibrations caused by motion of the cell during use and thus reduce or eliminate movement of the separator relative to the housing. If present, the shim structures may function as a current collector to the housing. Utilization of the shim structures as a current collector may be useful if the molten anode level rises and falls during charge and discharge. The shim structures may provide a thin gap adjacent to the separator to facilitate wicking of a thin layer of molten anodic material against a surface of the separator. This wicking may be independent of the state of charge of the battery, and independent of the head height of anodic material.

In one embodiment, the first chamber may contain an anodic material, such as sodium, that may function as an anode. Other suitable anodic material may include one or both of lithium and potassium, and which may be used alternatively or additively with sodium. The anodic material may be molten during use. The first chamber may receive and store a reservoir of anodic material. Additives suitable for use in the anodic material may include a metal oxygen scavenger. Suitable metal oxygen scavengers may include one or more of manganese, vanadium, zirconium, aluminum, or titanium. Other useful additives may include materials that increase wetting of the separator surface by the molten anodic material. Additionally, some additives may enhance the contact or wetting of the separator with regard to the current collector, to ensure substantially uniform current flow throughout the separator.

The second chamber may contain the cathodic material, which may be, for example, one or more of a first cathodic material, a second cathodic material, or a third cathodic material. The first cathodic material may exist in elemental form or as a salt depending on a state of charge. That is, the first cathodic material presents in elemental form and/or salt form and the ratio of the weight percent of the first cathodic material in elemental form to the weight percent of the salt form may be based on the state of charge. Suitable materials for use as the first cathodic material may include aluminum, nickel, zinc, copper, chromium, tin, arsenic, tungsten, molybdenum, and iron. In one embodiment, the first cathodic material consists essentially of only one of zinc, copper, or chromium. In one embodiment, the first cathodic material consists essentially of only two of nickel, zinc, copper, chromium, or iron. In one embodiment, the first cathodic material consists essentially of only three of aluminum, nickel, zinc, copper, chromium, tin, arsenic, tungsten, molybdenum, and iron. The second cathodic material and the third cathodic material differ from the first cathodic material. The first cathodic material, second cathodic material, and the third cathodic material may be mixed with each other, may be adjacent to each other, or may be spatially and/or electrically removed from each other.

If present, the second cathodic material is different from the first cathodic material and may include aluminum, nickel, zinc, copper, chromium, and iron. Other suitable second cathodic materials may include tin and/or arsenic. Other suitable second cathodic materials may include tungsten, titanium, niobium, molybdenum, tantalum, and vanadium. The first cathodic material may be present relative to the second metals by a ratio that is less than about 100:1. In one embodiment, the first cathodic material may be present relative to the additive metals by a ratio in that is in a range from about 100:1 to about 50:1, from about 50:1 to about 1:1, from about 1:1 to about 1:50, from about 1:50 to about 1:95.

The first cathodic material can be self-supporting or liquid/molten, but in one embodiment the cathodic material is disposed on a support structure. Alternatively, a second cathodic material that has a different activation voltage may support the cathodic material. The support structure may be a foam, a mesh, a weave, a felt, or a plurality of packed particles, fibers, whiskers. A suitable support structure may be formed from carbon. A suitable carbon foam is reticulated vitreous carbon.

The first cathodic material can be secured to an outer surface of the support structure. The support structure can have a high surface area. The first cathodic material on the support structure may be adjacent to the first surface of the separator and extend away from that separator surface. The support structure can extend away from the first surface to a thickness that is greater than about 0.01 millimeters. In one embodiment, the thickness is in a range of from about 0.01 millimeters to about 0.1 millimeter, from about 0.1 millimeters to about 1 millimeter, from about 1 millimeter to about 5 millimeters, from about 5 millimeters to about 10 millimeters, from about 10 millimeters to about 15 millimeters, from about 15 millimeters to about 20 millimeters. For larger capacity electrochemical cell, the thickness may be larger than 20 millimeters.

By placing the first cathodic material on the support structure surface, rather than in the second chamber as a liquid melt, the homogeneity of the liquid can be avoided. That is, the placement on the support allows for the ability to locate specific materials within the electrochemical cell. For example, a concentration of the first cathodic material in elemental form may differ from a point nearer the separator relative to a point further from the separator. Like an onion, there can be layers of the first cathodic material being present in different concentrations or amounts depending on where located inside the electrochemical cell. Similarly, a gradient can be formed to address, for example, electrical resistivity rise or to provide a more constant availability of reactant as the reaction front area changes as it is used and advances into the cell body away from the separator surface. A gradient, as used herein, can include a concentration step change, and as such can be configured to function as a state of charge indicator.

A suitable material for the anodic material supplying the transport ion is a Group I metal, such as sodium. Salts of the anodic material may be metal halides. Suitable halides may include chloride. Alternately, the halide may include bromide, iodide or fluoride. In one embodiment, the halide may include chloride, and one or more additional halides. Suitable additional halide may include iodide or fluoride. In one embodiment, the additional halides are sodium iodide or sodium fluoride. The amount of additional halide may be greater than about 0.1 weight percent. In one embodiment, the amount is in range of from about 0.1 weight percent to about 0.5 weight percent, from about 0.5 weight percent to about 1 weight percent, from about 1 weight percent to about 5 weight percent, from about 5 weight percent to about 10 weight percent.

In one embodiment, the electrolyte may include salts of a first metal, a second metal and a third metal to form a ternary melt at an operating temperature that is sufficiently high to melt the salts. The ternary melt can be, for example $MCl_2$: $NaCl$:$AlCl_3$, where M represents the first metal. Suitable metals for use as the first metal "M" include transition metals.

Suitable ratio of $MCl_2$ to NaCl to $AlCl_3$ can have the $MCl_2$ content up to about 20 weight percent. The amount of the $AlCl_3$ present in the ternary melt may be in a range greater than about 10 weight percent based on the total weight. In one embodiment, the amount of $AlCl_3$ in the ternary melt is in a range of from about 10 weight percent to about 20 weight percent, from about 20 weight percent to about 30 weight percent, from about 30 weight percent to about 40 weight percent, from about 40 weight percent to about 50 weight percent, from about 50 weight percent to about 60 weight percent, or from about 60 weight percent to about 70 weight percent. In one embodiment, the amount of $AlCl_3$ is greater than an amount of NaCl based on weight. In another embodiment, the amount of NaCl is greater than an amount of $AlCl_3$ based on weight.

In one embodiment, the plurality of electrolyte salts includes a mixture of two metal salts to form a binary melt at the operating temperature. Suitable binary melts can include $MCl_2$:NaCl or $MCl_2$:$AlCl_3$. In one embodiment, the binary melt consists essentially of $MCl_2$:$AlCl_3$. Suitable amount of the $MCl_2$ may be greater than 10 weight percent. In one embodiment, the amount of the $MCl_2$ ranges from about 10 weight percent to about 20 weight percent, from about 20 weight percent to about 30 weight percent, from about 30 weight percent to about 40 weight percent, from about 40 weight percent to about 50 weight percent, from about 50 weight percent to about 60 weight percent, from about 60 weight percent to about 70 weight percent, from about 70 weight percent to about 80 weight percent, or from about 80 weight percent to about 90 weight percent.

A sulfur or a phosphorous containing additive may be disposed in the cathodic material. In presence of sulfur or phosphorous in the cathode prevents recrystallization of salts and grain growth. For example, elemental sulfur, sodium sulfide or triphenyl sulfide may be disposed in the cathode.

Suitable operating temperature for the energy storage device may be greater than about 150 degrees Celsius and may be selected based on components and performance requirements. In one embodiment, the operating temperature is in a range of from about 150 degrees Celsius to about 200 degrees Celsius, from about 200 degrees Celsius to about 250 degrees Celsius, from about 250 degrees Celsius to about 300 degrees Celsius, from about 300 degrees Celsius to about 350 degrees Celsius, from about 350 degrees Celsius to about 400 degrees Celsius, from about 400 degrees Celsius to about 450 degrees Celsius, from about 450 degrees Celsius to about 500 degrees Celsius, or from about 550 degrees Celsius to about 600 degrees Celsius.

The separator is a sodium ion conductor solid electrode that conducts sodium ions during use. Suitable separators may include a composite of alumina and a metal (ceramic) oxide. The alumina may be beta alumina', beta" alumina or their mixture and has fast conductivity for sodium ions. Beta alumina has a composition range defined by $Na_2O$—$Al_2O_3$ phase diagram. The beta alumina has hexagonal crystal structure and contains about 1 mole of $Na_2O$ to about 9 moles of $Al_2O_3$. The beta" alumina has a higher ratio of about 1 moles of $Na_2O$ to about 5 mole of $Al_2O_3$ and has rhombohedral structure. In one embodiment, a portion of the separator is alpha alumina and another portion of the separator is beta alumina. The alpha alumina may be relative more amenable to bonding (e.g., compression bonding) than beta alumina, and may help with sealing and/or fabrication of the energy storage device.

The separator can be stabilized by the addition of small amounts of, but not limited to lithia, magnesia, zinc oxide, yttria or similar oxides. These stabilizers may be used alone or in combination with themselves or with other materials. The BASE may include one or more dopant. Suitable dopants may include oxide of a transition metal selected from iron, nickel, copper, chromium, manganese, cobalt or molybdenum. The separator, sometimes referred to as beta"alumina separator electrolyte (BASE), has higher sodium ion conductivity than beta alumina. Sodium ion conductivity of one form of beta"alumina separator electrolyte at 300 degrees Celsius is in a range of from about 0.2 $ohm^{-1}$ $cm^{-1}$ to about 0.4 $ohm^{-1}$ $cm^{-1}$.

The amount of the stabilizer to the beta"alumina can be greater than 0.5 weight percent. In one embodiment, the amount is in a range of from about 0.5 weight percent to about 1 weight percent, from about 1 weight percent to about 2 weight percent, from about 2 weight percent to about 3 weight percent, from about 3 weight percent to about 4 weight percent, from about 4 weight percent to about 5 weight percent, from about 5 weight percent to about 10 weight percent, from about 10 weight percent to about 15 weight percent, from about 15 weight percent to about 20 weight percent, or greater than about 20 weight percent based on the total weight of the beta"alumina material.

The metal oxide may be any suitable alkali metal oxide, an alkaline metal oxide, a transition metal oxide or a rare earth oxide. In one embodiment, the metal oxide may be a doped metal oxide. In another embodiment, the metal oxide includes mixed metal oxides. Suitable metal oxides may include zirconia, yttria, hafnia, ceria, and thoria. Other suitable mixed metal oxides may include yttria stabilized zirconia, rare earth oxide doped zirconia, scandia doped zirconia, rare earth oxide doped ceria, alkaline earth oxide doped ceria, or stabilized hafnia. In one embodiment, the metal oxide includes zirconia. The metal oxide may include yttria stabilized zirconia (YSZ) in one embodiment. Suitable amounts of yttria in YSZ may be greater than about 1 weight percent, or may be less than about 10 weight percent. In one embodiment, the yttria amount may be in a range of from about 1 weight percent to about 2 weight percent, 2 weight percent to about 3 weight percent, 3 weight percent to about 4 weight percent, 4 weight percent to about 5 weight percent, 5 weight percent to about 6 weight percent, 6 weight percent to about 7 weight percent, 7 weight percent to about 8 weight percent, 8 weight percent to about 9 weight percent, or greater than about 9 weight percent. While grains are discussed further below, the presence of a metal oxide may reduce the chance of forming grains of relatively increased grain size.

Suitable methods of manufacture include sintering, and optionally subsequent forging of the sintered item, and crystal growth using, for example, flux methods. In one embodiment, an additive can be used to affect the resultant ceramic monolith. Zirconium, YSZ or selenium can be an additive to the composite separator material during formation. Control of the grain size, grain boundaries, and chemistry at the grain boundaries for polycrystalline or semi-polycrystalline material can be had by selection of the starting materials, the addition order and amounts of those materials, and formation type and method.

Alternatively, making a composite of alpha-alumina and an oxygen-ion conductor, and then exposing the composite to a vapor, fume or plasma containing an alkali-metal oxide may form a suitable separator. A suitable oxygen-ion conductor may include one of the above-mentioned metal-oxides and stabilized metal oxides. Suitable alkali-metal oxides may include sodium oxide. The vapor, fume or plasma may include one or more above-mentioned stabilizers to inhibit transformation of beta"-alumina to the beta-alumina. Alternatively or additionally, the stabilizer may be added to the composite.

A suitable separator formed from a ceramic composite may start as alpha-alumina with an oxygen-ion conductor formed as a green body. The green body may be processed by pressing, extrusion, slip casting, injection molding, tape casting, and the like, followed by sintering or hot-pressing. The physical properties of the final product derive in large part from those of the initial ceramic composite, and from the processing of the green body.

The alpha-alumina and the oxygen-ion conductor are present in the green body in amounts sufficient to form continuous matrices of an alpha-alumina phase and an oxygen-ion conductor phase. This provides two continuous and interpenetrating networks. The amounts may be in a range of from about 90 vol. % to about 70 vol. % of alpha-alumina and from about 10 vol. % to about 30 vol. % of oxygen-ion conductor. As mentioned, the green body may be exposed to the appropriate ion species (as a metal oxide) in the form of an alkali-metal-oxide vapor, fume or plasma at an elevated temperature at a temperature of greater than about 800 degrees Celsius and less than about 1700 degrees Celsius (at ambient pressure). The temperature may be based on the evaporation loss of the alkali-metal oxide.

The vapor, fume or plasma may include the oxide of the alkali-metal and, optionally, the stabilizing ion, if the beta"-form is desired. The green body may be packed in a powder of the vapor, fume or plasma precursor, which, when heated to reaction temperature produces the vapor, fume or plasma. During the conversion process, oxygen ions transport through the oxygen-ion conductor while sodium ions transport through the green body. Transport channels are provided for both ion species to enhance the reaction kinetics. The reaction kinetics may be based on the formation of alkali-metal-beta- or beta"-alumina at the reaction front; which is the boundary separating alpha-alumina (with oxygen-ion conductor) and formed alkali-metal-beta-alumina or beta"-alumina (with oxygen-ion conductor). By controlling the sodium ion activity in the vapor-, fume- or plasma-formation (and without sintering) there is little or no formation of liquid phases. And, there is little or no formation or deposition of, for example, sodium aluminate in the grain interstitial spaces. The smaller grain size may reduce or eliminate the volume of the grain interstitial spaces, too.

With further regard to the grains of the separator, the separator has a microstructure having a plurality of grains. In one embodiment, the plurality of grains may contain some grains of stabilizer (e.g., zirconia) in an interpenetrating phase or matrix, as disclosed herein. The grains of stabilizer compared to the grains of other material present in the composite separator may be in a range of more than about 10 percent. In one embodiment, the grains of stabilizer in the composite separator may be in a range of from about 10 percent to about 20 percent, from about 20 percent to about 30 percent, from about 30 percent to about 40 percent, or from about 40 percent to about 50 percent.

In another embodiment, the composite separator may have graded concentration of the grains of stabilizer through the thickness of the composite separator. By "graded" the concentration of the indicated material changes over cross-sectional difference. Unless indicated otherwise, graded includes smoothly sloped rates of concentration change as well as a plurality of step changes of concentration. In an axial direction, the concentration of stabilizer grains may be graded, but in at least one embodiment the grains may extend a certain distance and then stop as the separator has a boundary the other side of which is alpha alumina.

In addition, the composite separator microstructure may not unduly change or degrade during use. The grains of the composite may have grain boundaries defining interstitial spaces that are free of the ternary melt or the binary melt. In one embodiment, the plurality of grains may have grain boundaries defining interstitial spaces that are free of the ternary melt or the binary melt. Such interstitial spaces provide relatively higher conductivity of sodium ions.

The separator may be a ceramic composite of the oxygen-ion conductor and the beta- or beta"-alumina. In one embodiment, the BASE separator is a composite of beta" alumina and zirconia. Zirconia has good strength properties and good chemical stability. Thus, the resulting separator may be relatively mechanically stronger, more durable, and more reliable. Due to the associated chemically stable and strength, the composite BASE separator may improve the reliability of the electrochemical cell and may allow the use of a thinner walled separator having less ionic resistance while maintaining a suitable electrical resistance. A thinner wall of the composite separator may provide relatively more strength while maintaining a suitably high ionic conductivity.

The separator can be a tubular container in one embodiment having at least one wall. The wall can have a thickness; and an ionic conductivity and the resistance across the wall may depend in part on the thickness. Suitable thickness can be less than 5 millimeters. In one embodiment, the thickness is in a range of from about 5 millimeters to about 4 millimeters, from about 4 millimeters to about 3 millimeters, from about 3 millimeters to about 2 millimeters, from about 2 millimeters to about 1.5 millimeters, from about 1.5 millimeters to about 1.25 millimeters, from about 1.25 millimeters to about 1.1 millimeters, from about 1.1 millimeters to about 1 millimeter, from about 1 millimeter to about 0.75 millimeters, from about 0.75 millimeters to about 0.6 millimeters, from about 0.6 millimeters to about 0.5 millimeters, from about 0.5 millimeters to about 0.4 millimeters, from about 0.4 millimeters to about 0.3 millimeters, or less than about 0.3 millimeters.

A cation facilitator material can be disposed on at least one surface of the separator, in one embodiment. The cation facilitator material may include, for example, selenium. At least one separator surface has a surface roughness RMS in a range of greater than about 10 nanometers. In one embodiment, the surface roughness RMS is in range of from about 10 nanometers to about 20 nanometers, from about 20 nanometers to about 30 nanometers, from about 30 nanometers to about 40 nanometers, from about 40 nanometers to about 50 nanometers, from about 50 nanometers to about 60 nanometers, from about 60 nanometers to about 70 nanometers, from about 70 nanometers to about 80 nanometers, from about 80 nanometers to about 90 nanometers, from about 90 nanometers to about 100 nanometers.

The separator can seal to an inner surface of the housing by a sealing structure. The sealing structure can be of a glassy composition. The sealing structure is operable to maintain a seal between the contents and the environment at a temperature greater than about 100 degrees Celsius. In one embodiment, the operating temperature range is from about 100 degrees Celsius to about 200 degrees Celsius, from about 200 degrees Celsius to about 300 degrees Celsius, from about 300 degrees Celsius to 400 degrees Celsius, from about 400 degrees Celsius to about 500 degrees Celsius, from about 500 degrees Celsius to about 600 degrees Celsius. The separator may not etch or pit in the presence of a halogen and the anodic material.

Suitable glassy compositions may include, but are not limited to phosphates, silicates, borates, germinates, vanadates, zirconates, arsenates, and their various forms, for example, borosilicates, alumino silicate, calcium silicate, binary alkali silicates, alkali borates, or a combination of two or more thereof. Alternatively, the end portions of the separator may include alpha alumina. The alpha alumina can be bonded directly to the lid that encloses the second chamber. Suitable bonding methods may include thermal compression bonding, diffusion bonding, or thin film metallizing, each of these may be used in conjunction with welding or brazing techniques.

The article may have a plurality of current collectors including anode current collectors and cathode current collectors. The anode current collector is in electrical communication with the first chamber and the cathode current collector is in electrical communication with the contents of the second chamber. Suitable materials for the anode current collector may include Ti, Ni, Cu, Fe, or combinations of two or more thereof. Other suitable materials for the anode current collector may include steel or stainless steel. Still other suitable materials for the anode current collector may include carbon. The current collector may be plated or clad. The cathode current collector may be a wire, paddle or mesh formed from Pt, Pd, Au, Ni, Cu, C, or Ti. The plurality of current collectors can have thickness greater than 1 millimeter (mm). In one embodiment, the thickness is in a range of from about 1 millimeter to about 10 millimeters, from about 10 millimeters to about 20 millimeters, from about 20 millimeters to about 30 millimeters, from about 30 millimeters to about 40 millimeters, or from about 40 millimeters to about to about 50 millimeters. Cladding on the current collector, if present, may coat the current collector to a thickness greater than about 1 μm. In one embodiment, the cladding thickness is in a range of from about 1 micrometer (μm) to about 10 μm, from about 10 μm to about 20 μm, from about 20 μm to about 30 μm, from about 30 μm to about 40 μm, or from about 40 μm to about to about 50 μm.

The working of the article and the function of the electrochemical cell are described below with reference to illustrated embodiments. Referring to the drawings, the illustrations describe embodiments of the invention and do not limit the invention thereto.

Figure 1:
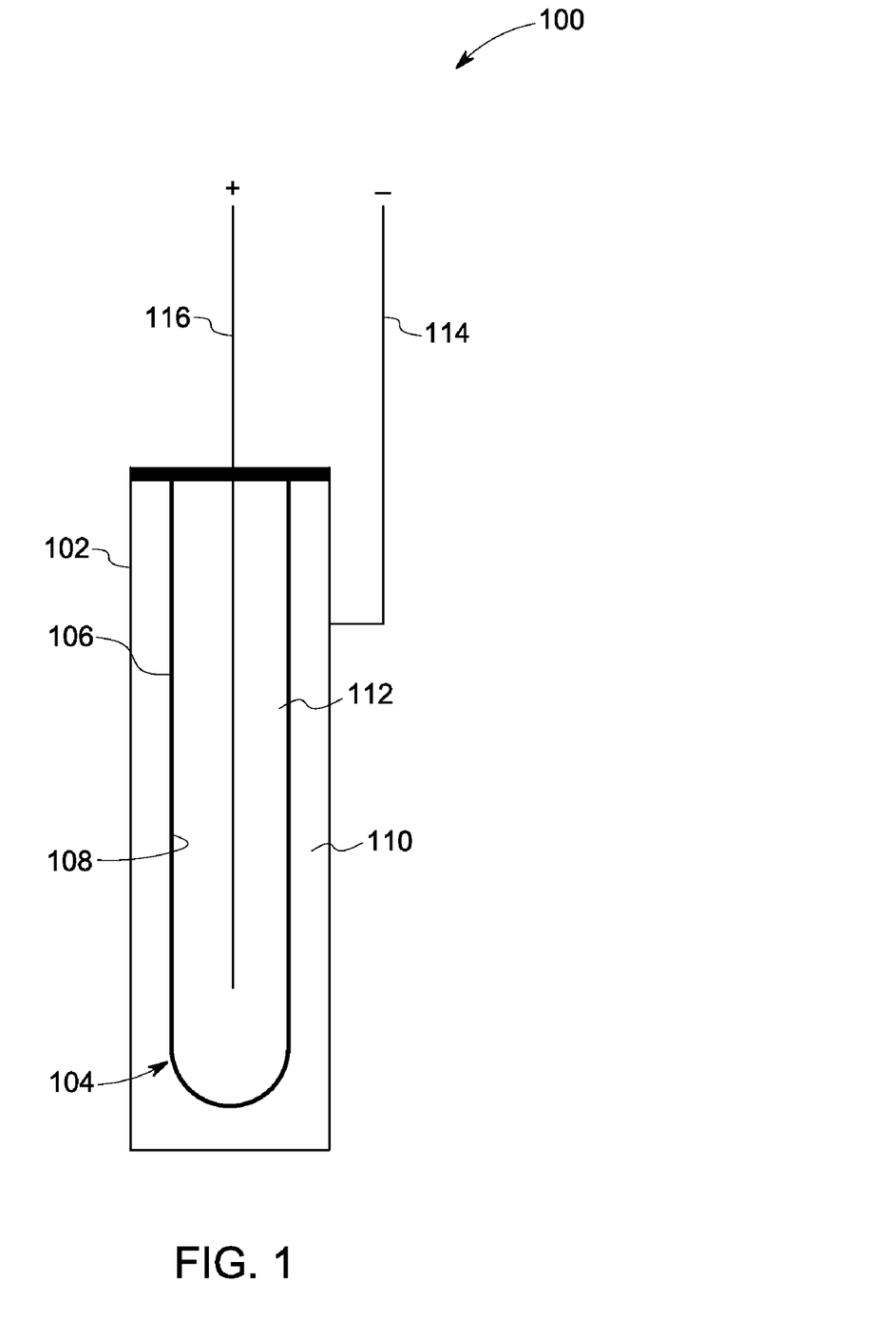
FIG. 1 is a schematic of an article according to one embodiment of the invention.

An article 100 in accordance with an embodiment is shown in FIG. 1. The article 100 may be used as an electrochemical cell for producing energy. The article includes a housing 102. The housing includes a separator 104 having an outer surface 106 and an inner surface 108. The outer surface defines a first chamber 110 and the inner surface defines a second chamber 112. The first chamber is an anode including sodium and the second chamber is a cathode including a plurality of salts. The first chamber is in ionic communication with the second chamber through the separator. The first chamber and the second chamber further include an anode current collector 114 and a cathode current collector 116 to collect the current produced by the electrochemical cell.

The article may be an electrochemical cell. The electrochemical cell may be assembled in the discharged state. Applying a voltage between the anode and the cathode of the electrochemical cell and reversing the electrochemical reaction may charge the electrochemical cell. During charging, sodium chloride in the cathode is decomposed by applied electrical potential to form sodium ions and chloride ions. Sodium ions, under the influence of applied electrical potential, conduct through the separator and combine with electrons from the external circuit to form the sodium electrode and chloride ions react with the transition metal in first material to form metal chloride and donate electrons back to external circuit. During discharge, sodium ions conduct back through the separator reversing the reaction, and generate electrons. The cell reaction is as follows:

2NaCl+cathodic material→(cathodic material)Cl$_2$+ 2Na

Figures 2, 2A, 2B, 2C, 2D, 2E, 2F, 2G, 2H, 2I, 2J:
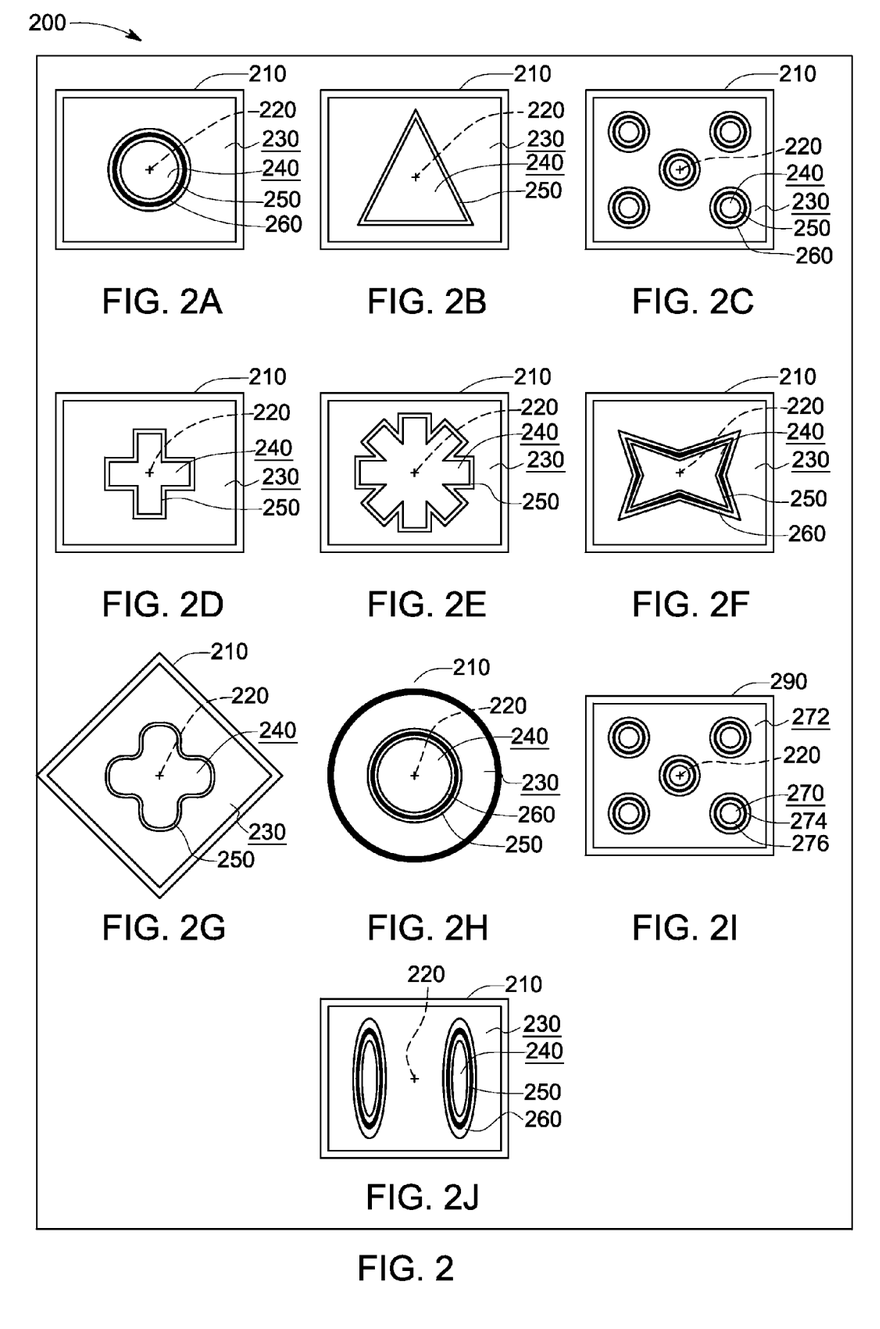
FIG. 2 is an array of designs (FIGS. 2A-2J) for use in embodiments of the invention.

With reference to FIG. 2, a plurality of energy storage devices are shown (FIGS. 2A to 2J) to illustrate various design choices. The same reference number is used to indicate the same part (by same, it serves the same function) from FIG. 2A to FIG. 2J. Accordingly, the collection 200 includes energy storage devices having an elongate housing 210 that defines an axis 220. An inner surface of the housing walls defines a volume. The volume includes an anode 230 and a cathode 240, which are separated physically from each other by a separator 250 and a wick 260. The wick is disposed on an outward facing surface of the separator and flows liquid anodic material over the separator surface for transport across the separator. Because the separator is a closed space, capped at each end, there are effectively two chambers within the volume—an inner chamber and an outer chamber.

Some of the designs are self-explanatory; others will be addressed in more detail. FIG. 2C includes a plurality of separators, each of which may have a wick and a current collector. For FIGS. 2D-2E, there is a phenomenon in which as the first material is consumed during use, the surface area of the front of unused material does not noticeably change. This is in contrast to FIG. 2A, for example, in which the surface area of the reaction front of first material becomes smaller as the amount of first material (which resembles a cylinder) is used.

FIG. 2I differs from the others in that an anode 270 is within, and a cathode 272 is outside, of a separator 274 with a wick 276 on an inner surface of the separator. And, there is a plurality of separators, similar to the embodiment shown in FIG. 2C. The housing 290 can be made from a high temperature, chemically resistant material.

For any of the foregoing, the first cathodic material can be deposited on a foamed support. However, in FIG. 2I, the support material can further support the separator. Such support can minimize or eliminate damage caused by thermal cycling, pressure differentials, and vibrations.

With reference to FIG. 2J, one separator with two "legs" that are cross-sectionally oval is provided. Not shown due to the perspective is an integral joining structure that would be above the "legs" during operation. The overall structure may look something like a pair of trousers. For even numbers of separators, the axis is not co-axial with at least one separator.

A plurality of the electrochemical cells can be aligned into an energy storage system. Multiple cells can be arranged in series or parallel to form a stack. The ratings for the power and energy of the stack may depend on such factors as the stack size or number of cells in the stack. Other factors may be based on end-use application specific criteria.

Various embodiments of the energy storage device can store an amount of energy that is in a range of from about 0.1 kiloWatt hours (kWh) to about 100 kWh. One embodiment of the energy storage device has an energy-by-weight ratio of greater than 100 Watt-Hours/kilogram, and/or an energy-by-volume ratio of greater than 160 Watt-Hours/liter. Another embodiment of the energy storage device has a specific power rating of greater than 150 Watts/kilogram.

Suitable energy storage devices may have an application specific Power to Energy ratio of less than 10 to 1. In one embodiment, the specific power to energy ratio is in range from about 1:1 to about 2:1, from about 2:1 to about 4:1, from about 4:1 to about 6:1, from about 6:1 to about 8:1, or from about 8:1 to about 10:1. In other embodiments, the specific power to energy ratio is in range from about 1:1 to about 1:2, from about 1:2 to about 1:4, from about 1:4 to about 1:6, from about 1:6 to about 1:8, or from about 1:8 to about 1:10.

In one embodiment of the energy storage system, a controller communicates with the plurality of the cells. The controller can distribute an electrical load to select cells in a cell stack in response to feedback signals indicated states for each of the cells in the cell stack. The controller is operable to perform a re-warm method in which a series of heating elements are activated in a sequence to melt a frozen portion of the energy storage device. In another embodiment, the controller may distribute an electrical load to select cathodic materials at determined locations within individual cells.

A suitable controller can be a proportional-integral-derivative controller (PID controller). The controller can measure a value from a process or other apparatus and compare it with a reference setpoint value. The difference (or "error" signal) may be used to adjust some input to the process in order to bring the process-measured value back to its desired setpoint.

If present, a heat management device maintains the temperature of the energy storage device. The heat management device can warm the energy storage device if too cold, and can cool the energy storage device if too warm. The heat management system includes a thaw profile that can maintain a minimal heat level in the first and second chambers to avoid a freeze of cell reagents.

Another embodiment of the invention provides an energy management system that includes a second energy storage device that differs from the energy storage device. This duel energy storage device system can address the ratio of power to energy in that a first energy storage device can be optimized for efficient energy storage, and a second energy storage device can be optimized for power delivery. The control system can draw from either energy storage device as needed, and charge back either energy storage device that needs such a charge.

Suitable second energy storage devices, for the power piece, include a primary battery, a secondary battery, a fuel cell, or an ultracapacitor. A suitable secondary battery may be a lithium battery, lithium ion battery, lithium polymer battery, or a nickel metal hydride battery.

EXAMPLES

The following examples are intended only to illustrate methods and embodiments in accordance with the invention, and as such should not be construed as imposing limitations upon the claims. Unless specified otherwise, all ingredients are commercially available from such common chemical suppliers as Alpha Aesar, Inc. (Ward Hill, Mass.), Spectrum Chemical Mfg. Corp. (Gardena, Calif.), and the like.

Example 1

Preparation of Electrode

Several metal-coated carbon foam electrodes, measuring 1.25 cm×1.25 cm×2 mm thick, are prepared by electroplating foamed carbon with a copper layer or a nickel layer, as appropriate. The carbon foam is obtainable from ERG Materials and Aerospace Corp. (Oakland, Calif.). The foam electrodes have a carbonaceous skeleton of reticulated vitreous carbon (RVC) foam. The carbon foam pore density is 100 pores per inch (PPI) and the pore diameter is about 100 micrometers on average.

The electroplating is performed in an aqueous copper or nickel solution, as appropriate. The plating encapsulates the carbon foam to form the prepared metal-coated porous electrode substrates. Several of the nickel-coated porous electrodes are further submersed in a zinc solution and zinc metal is plated onto the nickel layer.

The finished metal-coated carbon foam electrodes are analyzed and characterized. The surface of the copper-coated electrode substrates appears smooth and shiny at 200 times enlargement in an optical microscope. The effective copper density is about 0.01 $g/cm^3$. The surface of the nickel-coated electrode substrates appears smooth and shiny at 200 times enlargement in an optical microscope. The effective nickel density is 0.01 $g/cm^3$. The surface of the zinc-coated-nickel electrode substrates appears dull and nodular at 200 times enlargement in an optical microscope. The effective zinc density is 0.49 $g/cm^3$. The plated metal of the zinc on nickel electrode is about 0.2 micrometers thick, and the working electrode has a rectangular cross sectional thickness of 1.5 centimeters, and a depth of 2 millimeters.

Example 2

Preparation of a Separator

A plurality of separators are prepared. The plurality includes two groups of separators, each having a differing stabilizer phase type. The two different zirconia phase types include (i) 8 mol. % $Y_2O_3$ stabilized cubic phase zirconia (8YSZ) and (ii) 4.5 mol. % $Y_2O_3$ stabilized tetragonal and cubic phase zirconia (4.5YSZ).

The separators formed using the stabilized zirconia are formed as three types of discs. The three types of discs include two types of (i), and one type of (ii). The three samples sets are characterized as having compositions of: (a) 50 vol. % alpha-alumina+50 vol. % 8 YSZ; (b) 70 vol. % .alpha-alumina+30 vol. % 8 YSZ; and (c) 50 vol. % alpha-alumina+50 vol. % 4.5 YSZ. Disc-shaped samples of 2.5 millimeters (mm) thickness of compositions (a), (b), and (c) are fabricated using requisite powder mixtures, die-pressing, followed by isostatic pressing, and then sintering in air at 1600 degrees Celsius. The sintered discs are placed in a powder mixture. The powder mixture has a composition of 8.85 wt. % $Na_2O$, 0.75 wt. % $Li_2O$, and 90.45 wt. % $Al_2O_3$. The disks-in-powder are calcined at 1250 degrees Celsius for 2 hours to form sodium-beta"-alumina, and serves as the source of sodium and lithium oxides during reaction. Samples are maintained at 1450 degrees Celsius for 2 hours to about 16 hours. The samples are cross-sectioned and the thickness of sodium-beta"-alumina formed is measured.

One sample of composition (a) is further heat-treated at 1450 degrees Celsius for a longer time (32 hours) to ensure that it is fully converted into Na-beta-alumina all the way through. Conductivity (σ) was measured in a range of from about 200 degrees Celsius to about 500 degrees Celsius. The activation energy is measured to be about 15.7 kilojoule per mole (kJ/mol). Conductivity at 300 degrees Celsius is 0.0455 siemens per centimeter (S/cm) (resistivity of 22 ohm-centimeters (Ωcm)). This sample has 50 vol. % zirconia. Also, the grain size of Na-beta-alumina is a few micrometers. The measured conductivity is consistent with reported values for Na-beta-alumina of a fine-grained structure.

Example 3

Formation of a Test Cell, and Testing Thereof

The cell configuration for the test in Example 3 is substantially the same as the schematic configuration shown in FIG. 1. A composite separator tube, cylindrical in shape, is formed according to the process of Example 2 using composition (a). The cylinder dimensions are 228 mm length, 36 mm internal diameter, and 38 mm outside diameter. The composite separator tube is glass sealed to an alpha alumina collar. The assembly is placed in a stainless steel can. The can size is about 38 mm×38 mm×230 mm. The composite separator contains 50 grams (g) Cu, 22 grams NaCl, and 25 grams $NaAlCl_4$. In addition, 11 grams of reticulated vitreous carbon is added to the cathode to prevent settling of CuCl between charge and discharge. An electric heater surrounds the cell. During operation, the cell is heated to the operating temperature of 300 degrees Celsius. The cell is charged and discharged at currents of 4 amps and of 12 amps. After a few cycles of charge and discharge, the cell is shut down, cooled and inspected. Micrographic examination of the separator grains indicates no copper impregnation into the interstices.

The current collectors for the working electrodes and for the secondary electrodes are rectangular paddles formed from titanium, and which have the same cross-section shape and area as the foam-based electrodes. The paddles are spot-welded to 1-mm Ti wires. Several pieces of non-woven, borosilicate-glass-fiber filter media (Whatman GF/C) are stacked to a thickness of 0.15 centimeters (cm). Additional glass filter media is positioned on the backsides of the Ti paddles. A spring is fashioned by bending a length of 1-mm titanium wire into a W shape. This spring presses on the backsides of the titanium paddles, placing the entire assembly under slight compression. The addition glass media on the backsides of the paddle provides electrical insulation so that the spring does not create an electrical pathway between the two electrodes.

The connecting wires of the three electrodes pass through a PTFE tapered plug, which fits into a center neck of the flask. The sodium electrode, which is moisture sensitive, is connected last, using a $N_2$ purged dry glove bag. The wires are adjusted so that the foam electrodes are fully immersed in molten salt. The sodium reference electrode is adjacent, but external, to the working/secondary electrode assembly.

The external wire ends are connected to a computer-interfaced galvanostat (PARSTAT 2273 available from AMETEK Princeton Applied Research (Oak Ridge, Tenn.) and constant current data are measured. The working electrode is first oxidized for 3600 seconds at 100 milliamps (mA), then reduced at 400 milliamps for 900 seconds. Open-circuit potential relative to Na is measured as 2.077 volts. The charging voltage is 2.17 volts and the discharge voltage is 2.02 volts. When all the Zn is depleted from the Ni coated foam, the open circuit voltage is 2.58 volts.

Example 4

Forming a Test Energy Storage Device

An energy storage device is formed using a beta"-alumina tube and a copper tube. The beta"-alumina tube has an internal diameter of 6.5 mm, outside diameter of 8.6 mm, and an overall length of 68 mm. The copper tube is sized and shaped to receive the beta"-alumina tube. The copper tube has an internal diameter of 12.7 mm. The beta"-alumina tube is placed inside of the copper tube. In addition to the copper tube, 1.2 grams of sodium chloride and 3.4 grams of the electrolyte AlCl3:NaCl are placed in the space between the beta"-alumina tube inner surface and the copper tube outer surface. Inside the beta"-alumina tube are placed 0.2 grams of sodium in contact with a 1 mm diameter nickel wire (as a current collector).

The energy storage device body and the nickel current collector inside of the beta"-alumina tube are connected to a PAR potentiostat/galvanostat Model 2273. An electric heater surrounds the energy storage device. During testing, the heater (and subsequently the energy storage device) are heated to the operating temperature of 300 degrees Celsius.

Figure 3:
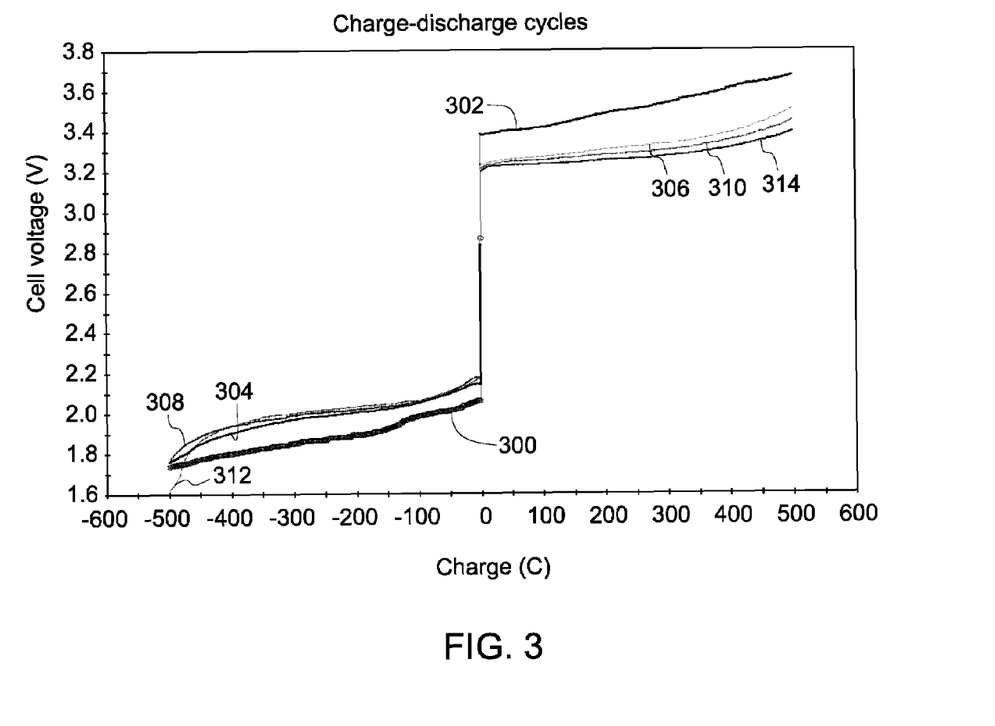
FIG. 3 is a graph showing polarization curves for an Example according to one embodiment of the invention.

After an initial charge cycle at a current of 0.025 A to a total charge of 1360 coulombs, the energy storage device is charged and discharged 140 times at a current of 0.5 A (61.8 $mA/cm^2$). The charge per cycle is 500 coulombs. The voltage between the terminals of the battery is oscillated between approximately 2 volts and 3.2 volts upon cycling. The polarization curves are shown in FIG. 3. Discharge curves (300, 304, 308, 312) and charge curves (302, 306, 310, 314) are shown for 10 cycles, 50 cycles, 90 cycles, 120 cycles respectively. No increase in cell resistance is observed.

Example 5

Forming a Test Energy Storage Device

Two energy storage devices are built, and each includes a commercially obtainable cylindrical beta"-alumina tube. These tubes did not contain a stabilizer, and each tube has sodium aluminate present in between grains, and the grains were of substantial size. Each tube has an inner diameter of 36 mm, outside diameter of 38 mm, and an overall length of 228 mm. A nickel foil is thermal compression bonded to an alpha alumina collar. The beta"-alumina tube is glass sealed to the foil coated alpha alumina collar to form an assembly. This assembly is placed inside a square stainless steel housing with approximate dimensions of 38 mm×38 mm×230 mm. The assembly is welded to the housing to make a hermetic seal. The nickel foil and alpha alumina collar defines an aperture in the assembly. The beta"-alumina tube is filled with cathodic material and other material through the aperture. The inside of the beta"-alumina tube is filled with 100 grams of copper, 44 grams of sodium chloride, 1 gram of aluminum, and 48 grams of electrolyte in the form of $NaAlCl_4$. A nickel rod is placed in the center of the beta"-alumina tube in contact with the anodic material to function as a current collector. The aperture is covered with a metal cap. The cap is welded to the collar to make a completely sealed cell.

Figure 4:
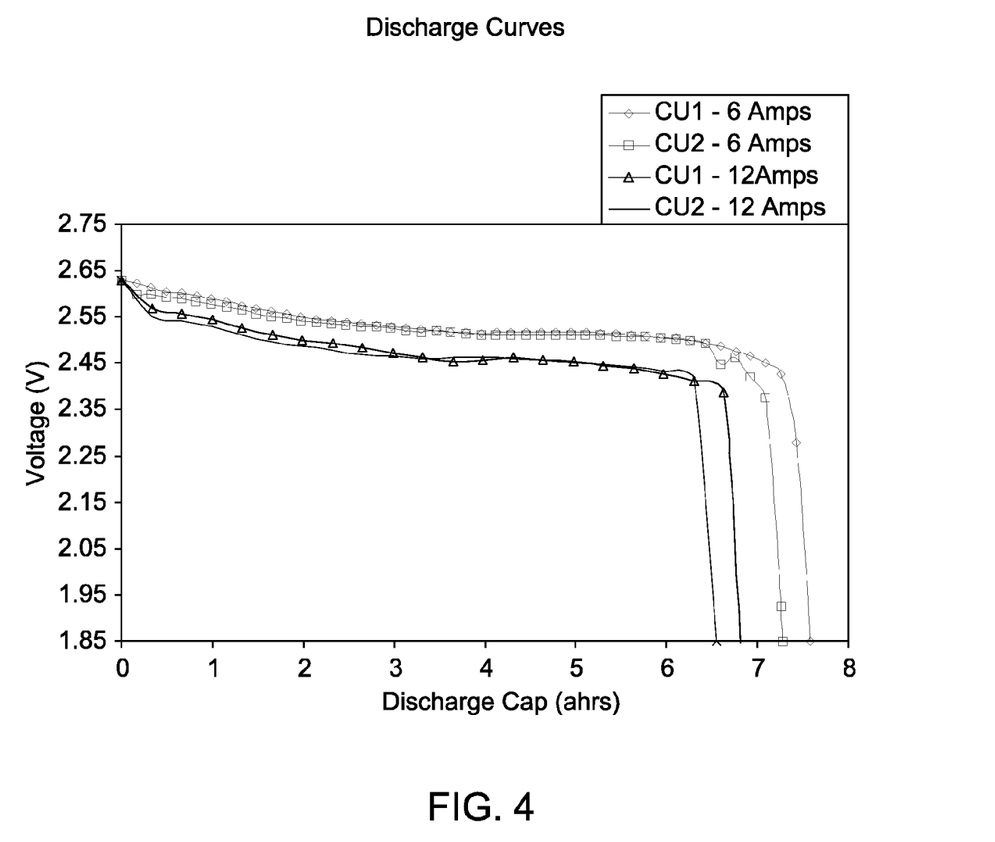
FIG. 4 is a graph showing performance for an Example according to one embodiment of the invention.

The theoretical capacity of this cell is 20.18 amp-hours. An electric heater surrounds the energy storage device. Switching on the heater, the temperature of the housing is ramped to an operating temperature of about 350 degrees Celsius. After an initial low current charge cycle at a current of 2.0 amps to a total charge of 17.95 amp-hours (64,620 coulombs), the energy storage device is charged and discharged at currents of 2 amps and 4 amps (the equivalent of 6 amps and 12 amps for a full cell). Energy storage device performance is indicated in FIG. 4.

The voltage of both energy storage devices is similar to each other, and is flat through the discharge cycle. The capacity of these cells depends on temperature: at 300 degrees Celsius an equivalent 2 amp discharge results in 2.25 amp-hours and at 380 degrees Celsius a 2 amp discharge provides 8.75 amp-hours.

Figure 5:
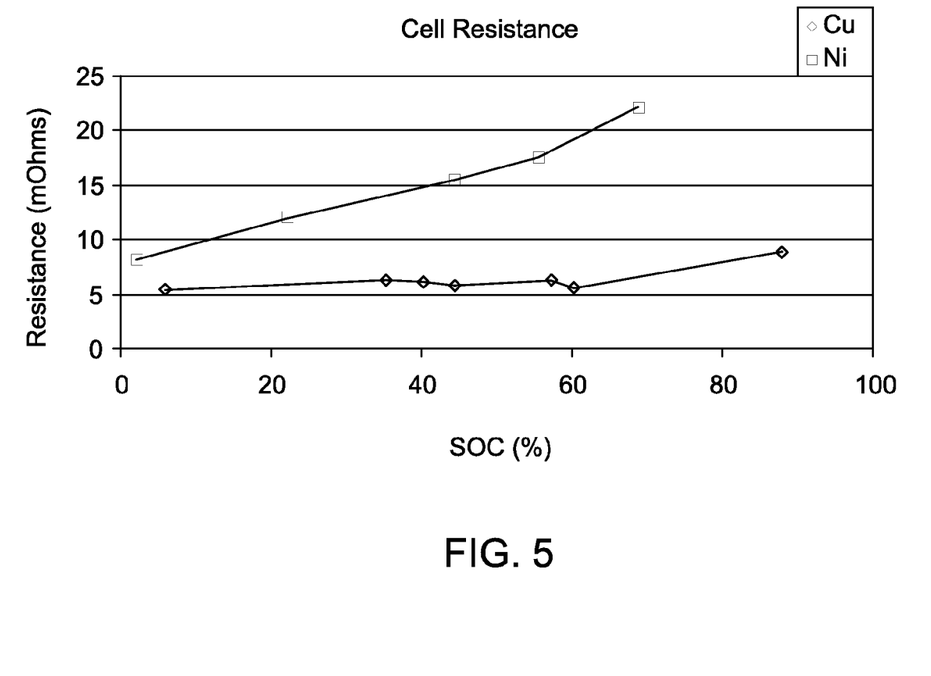
FIG. 5 is a graph showing comparisons of an Example according to an embodiment of the invention to a comparative sample.

FIG. 5 includes a comparison of the resistance of these test cells during charge compared to a standard $Na/NiCl_2$ cell. As shown, the test cells have relatively lower resistance and lower resistance rise vs. amp-hours charged. After only a few cycles each beta"-alumina tube cracked. The copper migrates up to about ⅓ the distance through the wall of the beta"-alumina tube.

Example 6

Forming a Test Energy Storage Device

An energy storage device is produced in the same fashion as the energy storage devices of Example 5, except 11 grams of carbon are added to the cathodic material. The added carbon prevents settling of CuCl during a charge mode of operation and a discharge mode of operation. An electric heater surrounds the energy storage device. The heater is activated to heat the energy storage device to an operating temperature of about 300 degrees Celsius.

After an initial constant-voltage charge cycle at a current of 3 to 15 amps to a total charge of 10 amp-hours, the energy storage device is charged and discharged at currents of 4 amps and at 12 amps. The charge performance of this cell is about the same as the charge performance of the energy storage devices of Example 4. The discharge voltage is also about the same. A difference relative to the energy storage devices of Example 4 is the utilization of the CuCl on discharge is higher—85% compared to ~50% average of the Example 4 devices. After only a few cycles, the separator tube cracked. The copper migrates up to about ⅓ the distance through the wall of the beta"-alumina tube.

Example 7

Forming a Test Energy Storage Device

In the same manner as in Example 6, an energy storage device is built, except the beta"-alumina tube differs. The beta"-alumina tube in this Example is fabricated by a vapor phase impregnation process. The beta"-alumina tube has less sodium aluminate in grain interstitial phases relative to the tubes used in Examples 5 and 6. The performance of the energy storage device of this Example is similar to the energy storage devices of Example 6. A difference is that after use, there is no copper impregnation or migration into the wall of the beta"-alumina tube.

The embodiments described herein may be examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. An energy storage device, comprising:
a separator having a first surface that defines at least a portion of a first chamber, and a second surface that defines a second chamber, and the first chamber is in ionic communication with the second chamber though the separator; and
a plurality of cathodic materials comprising at least a first cathodic material and a second cathodic material, both cathodic materials being in electrical communication with the separator and both cathodic materials having a reduced state and an unreduced state, the unreduced state comprising a metal halide, wherein the first cathodic material has a first electric potential that differs from a second electric potential of the second cathodic material, the energy storage device configured such that upon the first cathodic material being fully in the reduced state, the energy storage device electric potential changes from the first electric potential to the second electric potential,
with the proviso that if either of the first cathodic material or the second cathodic material is a transition metal, then the other of the first cathodic material and the second cathodic material is not iron, arsenic, or tin.

2. The energy storage device as defined in claim 1, wherein the first cathodic material comprises zinc, and the second cathodic material comprises copper.

3. The energy storage device as defined in claim 1, wherein the first cathodic material comprises nickel, and the second cathodic material comprises copper.

4. The energy storage device as defined in claim 1, wherein the first cathodic material comprises nickel, and the second cathodic material comprises zinc.

5. The energy storage device as defined in claim 1, wherein the first cathodic material comprises nickel, and the second cathodic material comprises zinc, and the plurality of cathodic materials further comprises a third cathodic material that comprises copper.

6. The energy storage device as defined in claim 1, wherein the first cathodic material comprises nickel, and the second cathodic material comprises zinc or copper, and the plurality of cathodic materials further comprises a third cathodic material that comprises molybdenum or tungsten.

7. The energy storage device as defined in claim 1, wherein the first cathodic material comprises nickel, and the second cathodic material comprises zinc or copper, and the plurality of cathodic materials further comprises a third cathodic material that comprises tin or arsenic.

8. The energy storage device as defined in claim 1, wherein the first cathodic material comprises zinc, and the second cathodic material comprises copper, and the plurality of cathodic materials further comprises a third cathodic material that comprises molybdenum or tungsten.

9. The energy storage device as defined in claim 1, wherein the first cathodic material comprises zinc, and the second cathodic material comprises copper, and the plurality of cathodic materials further comprises a third cathodic material that comprises nickel, and a fourth cathodic material that comprises tin or arsenic.

10. The energy storage device as defined in claim 1, wherein the plurality of cathodic materials, subject to the proviso, comprises two or more metals selected from the group consisting of nickel, zinc, copper, chromium, and iron.

11. The energy storage device as defined in claim 1, wherein the first cathodic material comprises nickel and the second cathodic material comprises aluminum or chromium.

12. The energy storage device as defined in claim 1, wherein the first cathodic material comprises copper and the second cathodic material comprises aluminum or chromium.

13. The energy storage device as defined in claim 1, wherein the plurality of cathodic materials comprises three or more metals selected from the group consisting of nickel, zinc, copper, chromium, and iron.

14. The energy storage device as defined in claim 1, wherein the plurality of cathodic materials comprises nickel, zinc, copper, chromium, and iron.

15. The energy storage device as defined in claim 1, wherein the plurality of cathodic materials, subject to the proviso, consist essentially of two metals selected from the group consisting of nickel, zinc, copper, chromium, tungsten, molybdenum, and iron.

16. The energy storage device as defined in claim 1, wherein the plurality of cathodic materials, subject to the proviso, consist essentially of three metals selected from the group consisting of aluminum, nickel, zinc, copper, chromium, tin, arsenic, tungsten, molybdenum, and iron.

17. The energy storage device as defined in claim 1, wherein the first cathodic material is present relative to the second cathodic material an amount in a range of from about 1:1 to about 5:1.

18. The energy storage device as defined in claim 1, wherein the first cathodic material is present relative to the second cathodic material an amount in a range of from about 5:1 to about 20:1.

19. The energy storage device as defined in claim 1, wherein the first cathodic material is present relative to the second cathodic material an amount in a range of from about 20:1 to about 50:1.

20. The energy storage device as defined in claim 1, wherein the plurality of cathodic materials comprises one or more halides selected from the group consisting of chlorine, fluorine, bromine, and iodine.

21. The energy storage device as defined in claim 1, wherein the plurality of cathodic materials comprise a supporting electrolyte that is molten at an operating temperature that is in a range greater than about 150 degrees Celsius.

22. The energy storage device as defined in claim 21, wherein the molten supporting electrolyte comprises a ternary melt.

23. The energy storage device as defined in claim 21, wherein the molten supporting electrolyte comprises a binary melt.

24. The energy storage device as defined in claim 1, wherein the molten supporting electrolyte comprises sulfur or phosphorous.

25. The energy storage device as defined in claim 1, further comprising an anodic material comprising sodium.

26. The energy storage device as defined in claim 25, wherein the anodic material further comprises aluminum or titanium.

27. The energy storage device as defined in claim 1, wherein the separator comprises beta-alumina and at least one stabilizer that is an alkali metal oxide, an alkaline metal oxide, a transition metal oxide, or a rare earth oxide.

28. The energy storage device as defined in claim 27, wherein the stabilizer comprises an oxygen transporting doped metal oxide or an oxygen transporting mixed metal oxide.

29. The energy storage device as defined in claim 1, wherein the separator comprises at least one of zirconia, yttria, hafnia, ceria, or thoria.

30. An energy storage system comprising the energy storage device as defined in claim 1.

31. The energy storage system as defined in claim 30, wherein the energy storage system can store an amount of energy that is greater than 10 kilowatt-hours.

32. The energy storage system as defined in claim 30, wherein the energy storage device has an energy-by-weight rating of greater than 100 Watt-hours/kilogram, and an energy-by-volume rating of greater than 160 Watt-hours per liter.

33. The energy storage system as defined in claim 30, wherein the energy storage device has specific power rating of greater than 150 Watts per kilogram.

34. The energy storage system as defined in claim 30, wherein the energy storage device has a Power-to-Energy ratio in a range of from about 1 (hour-1) to about 10 (hour-1).

* * * * *

UNITED STATES PATENT AND TRADEMARK OFFICE
CERTIFICATE OF CORRECTION

| | |
|---|---|
| PATENT NO. | : 7,632,604 B2 |
| APPLICATION NO. | : 11/769752 |
| DATED | : December 15, 2009 |
| INVENTOR(S) | : Iacovangelo et al. |

Page 1 of 1

It is certified that error appears in the above-identified patent and that said Letters Patent is hereby corrected as shown below:

Title Page 2, in Field (56), under "FOREIGN PATENT DOCUMENTS", in Column 2, Line 1, delete "2164789" and insert -- 2164786 --, therefor.

In Column 1, Line 60, delete "BRIEF DESCRIPTION OF DRAWING FIGURES" and insert -- BRIEF DESCRIPTION OF DRAWINGS/FIGURES --, therefor.

In Column 5, Line 29, delete "discharge" and insert -- discharge. --, therefor.

In Column 18, Line 49, in Claim 1, delete "though" and insert -- through --, therefor.

In Column 20, Line 36, delete "Beta-alumina" and insert -- beta"-alumina --, therefor.

In Column 20, Line 61, in Claim 34, delete "1(hour-1) to about 10 (hour-1)." and insert -- 1 $(hour^{-1})$ to about 10 $(hour^{-1})$. --, therefor.

Signed and Sealed this

Sixteenth Day of March, 2010

David J. Kappos
*Director of the United States Patent and Trademark Office*